Figure 2:
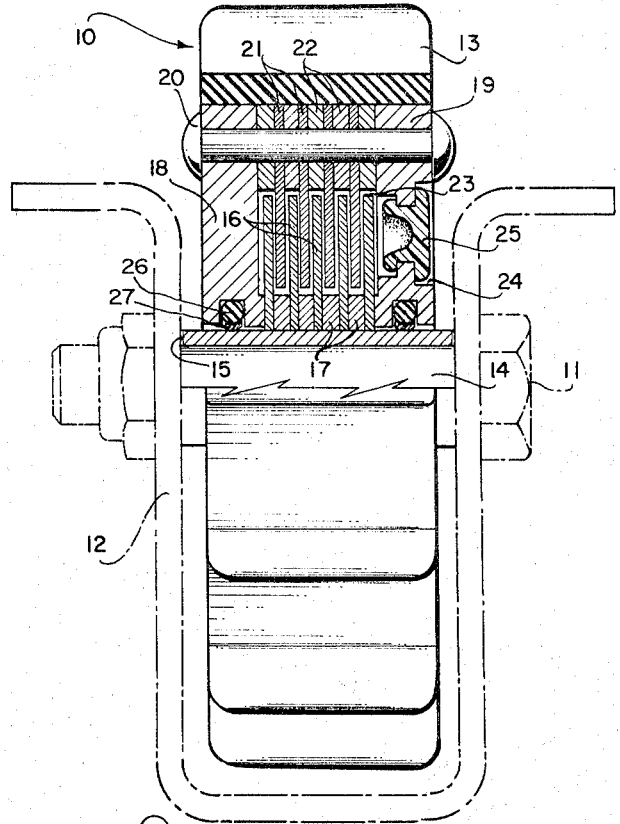

Jan. 3, 1967  D. G. SMITH  3,295,639

ROTARY RETARDING UNIT

Filed Jan. 5, 1965

INVENTOR.
DONALD G. SMITH
BY
*George C. Sullivan*
Agent

United States Patent Office 3,295,639
Patented Jan. 3, 1967

3,295,639
ROTARY RETARDING UNIT
Donald G. Smith, Marietta, Ga., assignor to Lockheed Aircraft Corporation, Burbank, Calif.
Filed Jan. 5, 1965, Ser. No. 423,437
7 Claims. (Cl. 188—90)

This invention relates to rotary units such as wheels, rollers and the like and more particularly to such a unit having a preselected, limited, rotational velocity regardless of the rotational force applied thereto.

While the present invention has general application wherever it is desired to reduce and thereby control the speed of a rotary unit, it finds particular utility in mechanisms that employ gravity forces for the lowering or dropping of objects. Such mechanisms include payout pulleys for cables, conveyor beds and the like wherein movement of a mass or load is effected by the pull of gravity or a component thereof acting on the load.

Various braking or retarding schemes have been heretofore provided and proposed to limit the rate of descent of such "free falling" loads. Thus, brake shoes, gear trains, skids and similar restraining devices have been associated with or incorporated in these rotary mechanisms or units. These prior restraining devices have common failings. They are complex in structure and operation, subject to rapid wear, etc., requiring frequent attention, servicing, adjustment and/or replacement of parts.

The instant invention is predicated on an entirely new approach to the rotary retarding problem in gravity operating devices, although the underlying principle employed is well known and understood through much analytical study and experimentation. This basic principle resides in the use of shear forces across a fluid medium to transmit and/or control relative rotary movement between independently mounted parts. Thus, fluid clutches, rotary viscous dampers and similar devices have been heretofore employed to advantage.

It is therefore herein proposed to use this same fundamental principle to still further advantage in a rotary retarding unit having utility among other things in gravity lowering or dropping apparatus. To this end, the invention consists essentially in a freely rotatable wheel mounted on a fixed support, the outer peripheral portion of such wheel being adapted to receive a tangentially applied force causing its rotation. Internally this wheel is formed or otherwise provided with at least one surface disposed in spaced relation with at least one complemental or coacting surface on the fixed support. A fluid fills the space thus defined by each such pair of complemental surfaces whereby rotation of the wheel is opposed by the resistance created by the fluid. By changing the fluid viscosity, the value of the resistance of a retarding unit of given configuration is varied and the velocity of the rotation of the wheel may be adjusted accordingly.

Moreover, the foregoing construction wherein the wheel rotation induces a shearing action by the fluid permits rotation of the wheel at slow speed by a comparatively small tangential force, but restricts faster speeds and relatively large tangential forces. Maximum speed of the wheel is thereby limited to the geometry of the unit and the viscosity of the fluid.

Additionally, this proposed construction lends itself to a fabrication whereby heat generated within the fluid may be readily dissipated therefrom. This, together with the selection of a fluid having good lubricating characteristics assures the unit of a lengthy duty cycle without breakdown of the fluid viscosity.

Figure 1:
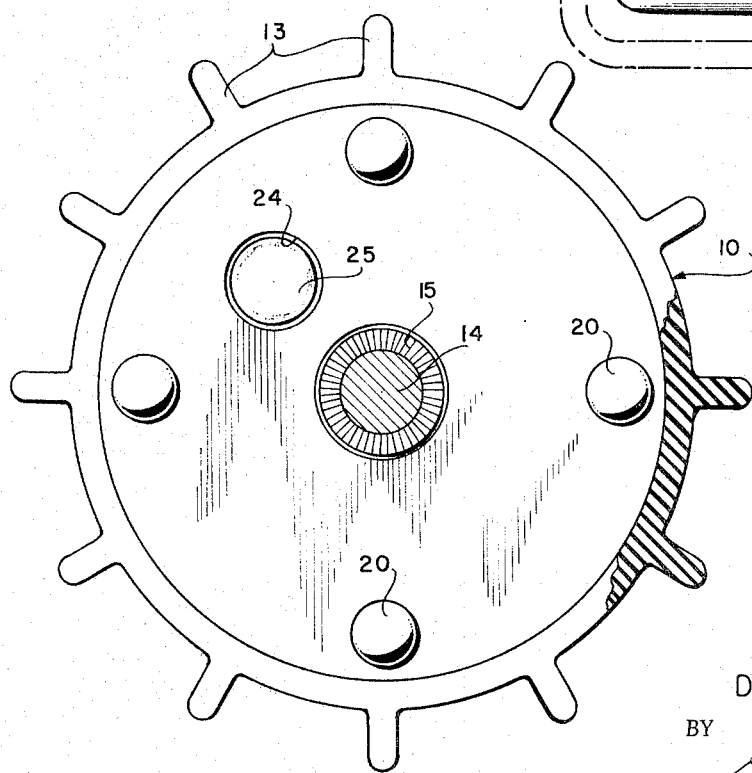

With the above and other objects in view, as will be apparent, this invention consists in the construction, combination and arrangement of parts all as hereinafter more fully described, claimed and illustrated in the accompanying drawings wherein:

FIGURE 1 is a side elevation of a rotary retarding unit in accordance with the teachings of the invention illustrating a preferred embodiment thereof as applicable to a gravity conveyor; and FIGURE 2 is a side view thereof partly in section to show the construction and fabrication thereof with the associated conveyor structure being illustrated in phantom lines.

Referring with greater particularity to the drawings, 10 designates the rotary retarding unit assembly mounted through a bolt 11 to fixed structure 12 of a gravity conveyor. The unit 10 is thereby disposed in an upstanding position with a portion of its peripheral surface projecting from the upper limits of the conveyor to establish the conveying plane over which objects or loads are intended to pass. The outer peripheral surface of the unit 10 is formed or otherwise provided with frictional engagement means such as, for example, projecting fingers 13 fabricated of rubber or other high friction material to prevent conveyed objects from sliding over it. Hence, these frictional fingers 13 apply a rotational force on the unit 10 about the connector 11.

The unit 10 is secured to the structure 12 being mounted on the shank of bolt 11 through a central hub 14, the end surfaces of which are serrated as at 15 to engage and coact with the associated surfaces of the structure 12. A plurality of relatively thin discs 16 are mounted on the hub 14 each in spaced relation to the other so as to project radially therefrom, spacing elements 17 being disposed between each adjacent disc 16 to establish a predetermined distance therebetween adjacent the outer end portions thereof. Thus positioned, the several discs 16 and spacers 17 are fixedly secured to the hub as for example by shrink/press fit, welding, etc., so as to constitute a stator element on the unit 10.

Overlying and surrounding this stator element is a rotor element. To this end, side plates 18 and 19 pierced centrally to pass over the hub 14 are positioned one on each outer end of the hub adjacent the outer surface of the associated disc 16. Adjacent its outer periphery each plate 18 and 19 is pierced by a plurality of transverse apertures, each adapted to be aligned with an aperture in the other plate 18 or 19 and when so aligned receive a fastener or bolt 20 by which the plates are clampingly engaged to form a unitary structure. Between the plates 18 and 19 thus secured is a plurality of discs 21 and spacers 22 each the equivalent of and for all intents and purposes identical to the discs 16 and spacers 17, respectively.

The outer or free ends of the several discs 16 and 21 are thereby disposed in alternate, overlapped and spaced relation with respect to each other and together with the adjacent end surfaces of the several spacers 17 and 22 as well as the inner surfaces of the plates 18 and 19 define a space or chamber 23. One of the plates, for example plate 19, is pierced transversely to establish communication between the chamber 23 and the outside of the unit 10 constituting a filler opening 24 whereby fluid of preselected viscosity is admitted to the chamber 23. A closure plug 25 fabricated of suitable material, preferably one impervious to the fluid to be employed, is removably secured in the opening 24. To facilitate this the opening 24 is enlarged at each end to receive laterally disposed projections resiliently formed on the ends of the plug 25 which operate in opposition to each other when installed in the opening 24.

Appropriate seals are provided between the adjacent surfaces of the plates 18, 19 and the hub 14 to prevent fluid leakage from the chamber 23. Preferably an O-ring seal 26 is mounted in a peripheral groove in each plate 18 and 19 and a backup ring 27 of low friction and high wear resistant material, such as for example Teflon, is associated therewith for contact with the hub 14. Such seals are known to the art and per se form no part of the present invention.

In view of the foregoing construction and mounting of the unit 10, a conveying plane is established thereby for objects or loads to be moved by gravitational forces. Manifestly, multiple such units 10 may be employed to comprise the conveyor bed or track, or these units 10 may be combined with the conventional free-rolling wheels or rollers to comprise the conveyor track. In any case the ultimate conveying plane is sloped or angularly disposed to the horizontal, whereby the mass of each object causes its movement down the conveyor track.

As the conveyed object or load contacts the fingers 13 of each unit 10, a rotational force is applied thereto causing the rotation of the rotor element including the discs 21. Such rotation of the rotor element is opposed however by the stator element including the discs 16 due to the interconnecting link effected by the fluid therebetween. The degree of this opposition will vary depending upon the viscosity of the particular fluid employed. Thus, the retarding action may be adjusted by the use of fluids of different viscosity.

During the operation as above described of each unit 10, frictional heat is generated in the fluid due to the shearing action thereof. In order to minimize such heat so as to prevent a change in the viscosity of the fluid, a lubricating liquid or oil is preferred. Moreover, the material employed in the fabrication of the several parts comprising the rotor element—that is, discs 21, spacers 22, and plates 18 and 19—is selected from those having a high thermal conductive capacity, such as aluminum and the like. Temperatures developed within the fluid are thereby transmitted rapidly out through the rotor element.

It should be understood that the foregoing disclosure describes a preferred embodiment of the invention. Numerous modifications or alterations may be made therein without departing from the spirit and the scope of the invention as set forth in the appended claims.

What is claimed is:

1. A rotary retarding unit comprising a hollow wheel rotatably mounted on fixed structure and having a periphery adapted to receive a tangentially applied force causing its rotation, complemental and coacting spaced surfaces carried by said wheel and said structure, each disposed within said wheel normal to the axis of rotation thereof, and a fluid of preselected viscosity confined between said surfaces and filling the spaces therebetween whereby the velocity of said wheel is constant regardless of the magnitude of the force applied as aforesaid.

2. The unit of claim 1 wherein said periphery includes multiple frictional surfaces.

3. The unit of claim 1 wherein said periphery is formed by a plurality of projecting fingers fabricated of high friction material.

4. The unit of claim 1 wherein said fluid is a lubricating liquid.

5. The unit of claim 1 wherein said wheel is fabricated of a material having a high thermal conductivity.

6. The unit of claim 1 wherein a portion of said periphery projects beyond said structure and said wheel defines an internal chamber in which said surfaces are disposed, and a closable access opening piercing said wheel to admit said fluid.

7. The unit of claim 6 wherein said wheel is formed by a plurality of annular discs, and a fastener securing said discs one to the other.

References Cited by the Examiner

UNITED STATES PATENTS

| | | | |
|---|---|---|---|
| 902,736 | 11/1908 | Jennings | 193—37 X |
| 2,514,137 | 7/1950 | O'Connor | 188—90 |
| 2,618,370 | 11/1952 | Orwin | 193—35 |
| 2,628,709 | 2/1953 | Steinmetz | 74—230.7 X |
| 3,113,647 | 12/1963 | Tuttle | 188—218 |

FOREIGN PATENTS 778,336   7/1957   Great Britain.

FERGUS S. MIDDLETON, *Primary Examiner.*

MILTON BUCHLER, *Examiner.*

G. E. A. HALVOSA, *Assistant Examiner.*